No Printed Specification Available
7061X
T. EWBANK.
Tinning Lead Pipe.
Patented May 16, 1832.
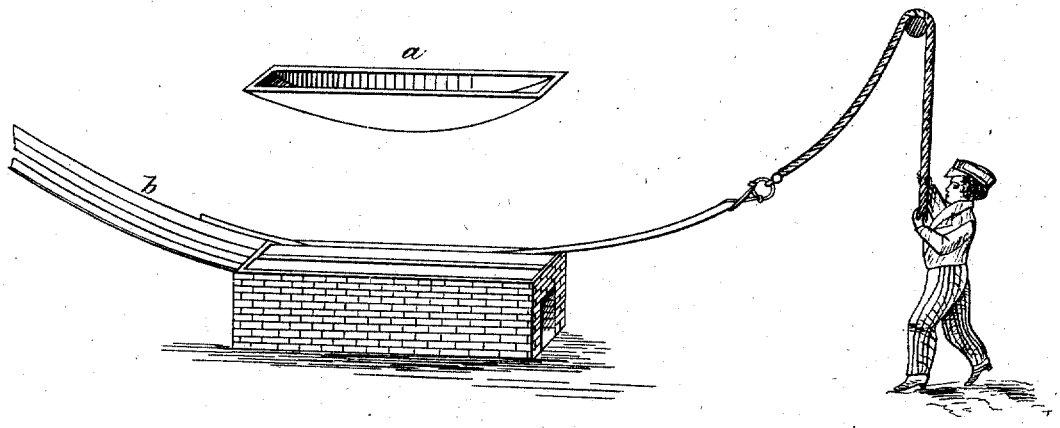
AM. PHOTO-LITHO. CO. N.Y. (OSBORNE'S PROCESS.)

7061X May 16, 1832

Thomas Ewbank

The Schedule referred to in these Letters Patent, and making part of the
same; containing a description in the words of the said Thomas Ewbank himself
of his improvement in the mode of coating Lead pipes with Tin.
To all whom it may concern, be it known, that I, Thomas Ewbank, of the city
of New York, have invented a mode of coating lead pipes with tin, in a more effec-
tual manner than has been heretofore done, and by which the danger attending the
use of such pipes for the conveyance of water, and other liquids, is obviated, whilst
their cost is but little enhanced; and that the following is a full and exact description
of my said invention. I take the lead pipes, after they have been drawn to the required
size, and I coat them with tin, either on both sides, or on the inside only, as may be
required. To do this I prepare a bath of melted tin, in a vessel of a suitable form & size
which may vary according to the size of the pipe to be tinned. I regulate the heat of
this bath, so that the tin shall continue in a fluid state, without becoming sufficiently
heated to melt the lead. This may be ascertained either by the use of a thermometer, or by testing
it by a piece of lead, or by such a mixture of lead and tin as will fuse at a given tem-
perature: with a little experience, however, a workman will not find any difficulty
in accomplishing this object without such aids. When the pipe is to be tinned on
the inside only, I cover the outside with lampblack and size, or with any other
article which will prevent the action of the tin upon it. I then blow powdered rosin into
the pipe. When it is to be tinned on both sides, the rosin is to be blown, or otherwise
passed into the pipe, and the outside also is to be sprinkled with it, and it is then ready
for the process. The melted tin should be kept covered with rosin, fat, or other
suitable article, to prevent its oxydation and to aid in the tinning. All that is ne-
cessary is then to pass the pipe through the melted tin, which when the pieces are
not of considerable length, may be easily managed by hand: or when of considerable
length, and weight, a rope and pulley or any other suitable mechanical contrivance
which the workman may prefer may be resorted to. I am aware that the coat-
ing of lead pipes with tin, simply, is not new, the same having been heretofore
done, but in a manner less perfect than that which I have just described. The
lead has been tinned in sheets and afterwards made into pipes, or the pipes have
been made and tinned and afterwards drawn to the intended size. By neither of these
processes, however, is the intended security attained with the same certainty as by
my process of tinning the pipes after they are otherwise finished. The coating of tin is thus rendered more perfect, and those fissures are avoided which the former process can scarcely fail to produce. I do not therefore, claim as my invention the mere tinning of pipes made out of lead, but what I do claim, is the tinning such pipes after they have been drawn to the proper size as hereinbefore set forth.

Thomas Ewbank

John M Bixby }
Exd Stephen Dando } Witnesses

[illegible]